(12) United States Patent
Wu (10) Patent No.: US 12,317,319 B2
(45) Date of Patent: May 27, 2025

(54) SYSTEM AND METHOD FOR REDUCING DELAYS OF TIMER-BASED TRANSMISSIONS ON A SHARED CARRIER

(71) Applicant: GOOGLE LLC, Mountain View, CA (US)

(72) Inventor: Chih-Hsiang Wu, Taoyuan (TW)

(73) Assignee: GOOGLE LLC, Mountain View, CA (US)

(*) Notice: Subject to any disclaimer, the term of this patent is extended or adjusted under 35 U.S.C. 154(b) by 440 days.

(21) Appl. No.: 17/428,458

(22) PCT Filed: Feb. 12, 2020

(86) PCT No.: PCT/US2020/017823
§ 371 (c)(1),
(2) Date: Aug. 4, 2021

(87) PCT Pub. No.: WO2020/167879
PCT Pub. Date: Aug. 20, 2020

(65) Prior Publication Data
US 2022/0110157 A1 Apr. 7, 2022

Related U.S. Application Data (60) Provisional application No. 62/804,665, filed on Feb. 12, 2019.

(51) Int. Cl.
*H04W 74/0816* (2024.01)
*H04L 27/00* (2006.01)

(52) U.S. Cl.
CPC ..... *H04W 74/0816* (2013.01); *H04L 27/0006* (2013.01)

(58) Field of Classification Search
CPC ..... H04W 16/14; H04W 72/20; H04W 72/21; H04W 72/23; H04W 74/0816;
(Continued)

(56) References Cited

U.S. PATENT DOCUMENTS 7,050,407 B1\* 5/2006 Frazer ................ H04W 72/543
455/452.2
10,123,350 B2 11/2018 Ye et al.
(Continued)

FOREIGN PATENT DOCUMENTS

CN 101061677 A 10/2007
CN 104066091 A 9/2014
(Continued)

OTHER PUBLICATIONS

Huawei et al., "Discussion on SR for NR-U," 3GPP (2018).
(Continued)

*Primary Examiner* — Jean A Gelin
(74) *Attorney, Agent, or Firm* — MARSHALL, GERSTEIN & BORUN LLP (57) ABSTRACT

A method for reducing transmission delays, implemented in a communication device, includes starting (502) a first timer. An expiration (504) of the first timer corresponds to a desired transmission time for a first message. The method also includes, before the expiration of the first timer, starting (504) a first channel access procedure of one or more channel access procedures, and determining (508), using the one or more channel access procedures, whether a shared carrier is available for transmission after the expiration of the first timer. The method also includes, based on whether the shared carrier is available for transmission after the expiration of the first timer (510), either transmitting (512) or not transmitting (514) the first message to another communication device via the shared carrier.

19 Claims, 7 Drawing Sheets

(58) Field of Classification Search
CPC ......... H04W 74/0825; H04W 74/0808; H04W 74/0841; H04W 74/0833; H04L 27/0006; H04L 5/0053

USPC ........................................................ 370/329

See application file for complete search history.

(56) References Cited

U.S. PATENT DOCUMENTS

| | | | |
|---|---|---|---|
| 10,264,605 B2 | 4/2019 | Godana et al. | |
| 2003/0096631 A1* | 5/2003 | Kayama | H04W 52/50 455/69 |
| 2004/0148546 A1* | 7/2004 | Meyer | H04L 1/1678 714/18 |
| 2005/0030894 A1* | 2/2005 | Stephens | H04L 47/10 370/329 |
| 2005/0093943 A1* | 5/2005 | O'Hara | B41J 2/14072 347/86 |
| 2007/0248040 A1* | 10/2007 | Huh | H04L 69/28 370/328 |
| 2009/0213818 A1* | 8/2009 | Park | H04W 74/0833 370/336 |
| 2010/0113042 A1* | 5/2010 | Kasslin | H04W 48/16 455/450 |
| 2014/0016547 A1* | 1/2014 | Jeong | H04W 74/08 370/328 |
| 2014/0056198 A1* | 2/2014 | Quan | H04W 52/0216 370/311 |
| 2015/0126506 A1* | 5/2015 | Castro | C07D 487/04 544/212 |
| 2016/0198457 A1* | 7/2016 | Chu | H04W 72/12 370/329 |
| 2017/0279565 A1 | 9/2017 | Han et al. | |
| 2018/0020382 A1* | 1/2018 | Kim | H04W 48/02 |
| 2018/0034588 A1* | 2/2018 | Lo | H04L 1/0057 |
| 2018/0049143 A1 | 2/2018 | Gupta et al. | |
| 2018/0376494 A1 | 12/2018 | Hu et al. | |
| 2019/0116514 A1* | 4/2019 | Ookubo | H04L 1/1664 |
| 2019/0313354 A1 | 10/2019 | Gupta et al. | |
| 2020/0107372 A1* | 4/2020 | Agiwal | H04W 24/08 |
| 2020/0344644 A1* | 10/2020 | Liu | H04L 69/04 |
| 2021/0045110 A1* | 2/2021 | Fröberg Olsson | H04W 72/0446 |
| 2023/0074024 A1* | 3/2023 | Zou | H04L 1/1877 |

FOREIGN PATENT DOCUMENTS

| | | |
|---|---|---|
| CN | 106134226 A | 11/2016 |
| CN | 106465138 A | 2/2017 |
| CN | 106538028 A | 3/2017 |
| CN | 107079494 A | 8/2017 |
| CN | 107113889 A | 8/2017 |
| CN | 107295694 A | 10/2017 |
| CN | 107431978 A | 12/2017 |
| CN | 107624265 A | 1/2018 |
| CN | 107852748 A | 3/2018 |
| CN | 107852766 A | 3/2018 |
| CN | 109314981 A | 2/2019 |
| CN | 109565761 A | 4/2019 |
| CN | 109565869 A | 4/2019 |
| WO | WO-2016/018182 A1 | 2/2016 |
| WO | WO-2016/046625 A1 | 3/2016 |
| WO | WO-2017/025000 A1 | 2/2017 |
| WO | WO-2018/062966 A1 | 4/2018 |
| WO | WO-2018/191916 A1 | 10/2018 |

OTHER PUBLICATIONS

International Search Report and Written Opinion for Application No. PCT/US2020/017823, dated May 20, 2020, 20 pages.

International Preliminary Report on Patentability for Application No. PCT/US2020/017823, dated Jul. 5, 2021, 22 pages.

Karupongsiri et al., A Hybrid Random Acess Method for Smart Meters on LTE Networks, IEEE XPLORE (Jul. 2016).

Office Action and Search Report for Chinese Patent Application No. 202080021126.0, dated Jun. 29, 2023.

Sony, DRS design for NR unlicensed Spectrum, 3GPP TSG RAN WG1 Meeting 91 (Nov. 2017).

Xiaoguang, TD-LTE-based network optimization design and application, China Master's Theses Full-text Database Information Technology Series (Jul. 2015).

Medium Access Control (MAC) protocol specification (Release 15), 3GPP TS 38.321 (2018).

Non-Access-Stratum (NAS) protocol for 5G system (5GS); Stage 3 (Release 15), 3GPP TS 24.501 (2019).

Radio Link Control (RLC) Protocol specification (Release 15), 3GPP TS 38.322 (2018).

Radio Resource Control (RRC) protocol specification (Release 15), 3GPP TS 38.331 (2018).

Study on NR-based access to unlicensed spectrum (Release 16), 3GPP TR 38.889 (2018).

* cited by examiner

SYSTEM AND METHOD FOR REDUCING DELAYS OF TIMER-BASED TRANSMISSIONS ON A SHARED CARRIER

FIELD OF THE DISCLOSURE

This disclosure relates to wireless communications and, more particularly, to wireless communication networks in which devices transmit messages using radio frequencies that are shared with other networks and/or devices (e.g., using unlicensed frequency bands).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In some wireless communication networks, communicating devices use timers to trigger certain messages. For example, according to the 3rd Generation Partnership Project (3GPP) specification for fifth-generation (5G) radio access ("NR") networks (e.g., 3GPP TS 38.321 v15.4.0 and TS 24.501 v15.2.1), a communication device (e.g., a user device, commonly referred to using the acronym "UE" for "user equipment," or a base station such as a gNB) runs various timers to ensure that the device transmits specific messages at the appropriate times. Some of these timers trigger messages that are transmitted on a periodic basis (referred to herein as "periodic timers"), other timers trigger the retransmission of certain messages (referred to herein as "retransmission timers"), and still other timers do not necessarily trigger any messages, and serve the purpose of delineating time periods in which the device is not permitted to transmit certain messages (referred to herein as "prohibit timers"). In some situations, a number of different timers of one or more types may run simultaneously. For example, a user device may regularly run a periodic timer that marks the times when the user device would normally transmit a particular message (e.g., a message indicating the remaining power headroom of the user device, or a scheduling request, etc.), while also running a prohibit timer that delineates a time period (e.g., specified by a gNB) in which the user device is not permitted to transmit that particular message.

Some wireless communication networks may also, in at least some scenarios, allow compatible devices to share an unlicensed carrier with other radio access technologies. In such cases, to avoid unfair use of the shared medium, devices operating in the unlicensed carrier typically need to perform channel access procedures before transmitting messages. In particular, a device may need to listen for other communications (i.e., detect energy) on the unlicensed carrier before using the carrier to transmit information, thereby reducing or eliminating interference with the communications of other networks/devices. For example, 3GPP TS 38.899 v16.0.0, which addresses the use of unlicensed carriers for 5G NR devices (under what is commonly referred to as the "NR-U" study item), attempts to maintain fair co-existence with radio access technologies such as WiFi® (IEEE 802.11) by requiring that 5G NR devices perform a "listen-before-talk" (LBT) procedure before transmitting via the unlicensed carrier.

If a communication device both (1) runs timers to trigger the transmission of certain messages, and (2) performs a channel access procedure such as LBT before using an unlicensed carrier, the transmissions of the timer-triggered messages are typically delayed by the full duration of the channel access procedure. Moreover, that duration may vary from message to message (e.g., if the device uses a variable-length "contention window" for an LBT), making it more difficult to compensate for the delay. Thus, while channel access procedures provide fairness among different devices trying to access an unlicensed carrier, those same procedures create undesired network inefficiencies/delays.

SUMMARY

A communication device of this disclosure reduces the transmission delay for a message sent over a shared carrier, by initiating a first channel access procedure before the expiration of a timer that triggers the transmission of that message. In the context of a communication device running a particular timer or transmitting a particular timer-triggered message, this disclosure refers to the earliest-initiated channel access procedure for that timer and/or message as the "first" channel access procedure, regardless of whether the communication device subsequently uses any other channel access procedure(s) for that timer and/or message. If the communication device does subsequently initiate another channel access procedure for that same timer and/or message, this disclosure refers to that subsequent procedure as a "second" channel access procedure, and so on.

The communication device initiating the first channel access procedure may be a user device that transmits the message to a base station (e.g., to a gNB, a gNB-DU, or an IAB node), a base station that transmits the message to a user device, or a base station that transmits the message to a wireless relay or another base station, for example. The timer may be dedicated to triggering the transmission of one or more particular types of message (e.g., a scheduling request message, a buffer status report message, etc.) in accordance with a particular standard or specification (e.g., the 3GPP specification for 5G NR), for example. In some implementations, the communication device implements the first channel access procedure at a physical (PHY) layer of a protocol stack, and implements the timer at a medium access control (MAC) or higher layer of the protocol stack.

If the first channel access procedure indicates that the shared carrier is not available (e.g., is not idle over a certain time window), the communication device may not transmit the message. For example, if the message is a message that the communication device normally transmits on a periodic basis, the communication device may skip transmission of the message until the end of a subsequent time period (i.e., at a subsequent expiration of a periodic timer). If the first channel access procedure indicates that the shared carrier is available, however, then the communication device may determine whether the first channel access procedure ended before or after the timer expired. If the first channel access procedure ended after the timer expired, the communication device may safely consider the shared carrier to be idle, and therefore transmit the message to the other, receiving device.

If the first channel access procedure ended before expiration of the timer, however, the communication device may initiate a second channel access procedure after the timer expires. Alternatively, the communication device may initiate the second channel access procedure slightly before the timer expires (e.g., at a time that ensures the second channel access procedure will not end until after the timer expires). In either case, if the second channel access procedure indicates that the shared carrier is not available, the communication device may skip transmission of the message (e.g., until a subsequent timer expiration). If the second channel access procedure instead indicates that the shared carrier is available, the communication device may safely consider the shared carrier to be idle, and transmit the message to the destination device. In some implementations and/or scenarios, the second channel access procedure is of a different type, category, and/or duration than the first channel access procedure. For example, the first channel access procedure may use a variable-length contention window, while the second channel access procedure may use a shorter, fixed-length contention window. In some implementations and/or scenarios, the communication device receives the timer duration, or other information from which the timer duration is derived, from the device that is the intended recipient of the message.

The amount of time by which the start of the first (and possibly only) channel access procedure precedes the expiration of the timer may depend on various factors, depending on the implementation and/or scenario. For example, the communication device may determine the start time for the channel access procedure based on a priority of the message to be transmitted, or based on a duration of the channel access procedure (e.g., a contention window duration/size). In other implementations and/or scenarios, the communication device may initiate the channel access procedure a predetermined time interval before the expiration of the timer.

In some implementations and/or scenarios, the communication device runs multiple timers corresponding to different messages, with the timers at least partially overlapping in time. In 5G NR, for example, one of the timers may trigger a periodic transmission of a power headroom report message, while another timer running at the same time may trigger a retransmission of a buffer status report message. In scenarios such as these, the communication device may initiate a single channel access procedure for all of the messages being triggered by those timers, at a time before any of those timers have expired. The communication device may then use the above-described technique to determine if and when to transmit each of the messages. For example, the communication device may transmit a given one of the messages on the shared carrier if the channel access procedure indicated an idle carrier after the corresponding timer expired, or start a second, subsequent channel access procedure if the first channel access procedure ended before the corresponding timer expired. In general, if the shared carrier is idle at the appropriate time(s), the communication device may transmit zero, one, some, or all of the messages when the first channel access procedure ends, and/or transmit zero, one, some, or all of the messages when the second channel access procedure ends, depending on the durations and starting times of the various timers and channel access procedures.

One example implementation of these techniques is a method, in a communication device, for reducing transmission delays. The method includes starting, by processing hardware of the communication device, a first timer. An expiration of the first timer corresponds to a desired transmission time for a first message. The method also includes, before the expiration of the first timer, starting, by the processing hardware, a first channel access procedure of one or more channel access procedures. The method also includes determining, by the processing hardware and using the one or more channel access procedures, whether a shared carrier is available for transmission after the expiration of the first timer and, based on whether the shared carrier is available for transmission after the expiration of the first timer, either transmitting or not transmitting the first message to another communication device via the shared carrier.

DETAILED DESCRIPTION OF THE DRAWINGS

Generally speaking, the techniques of this disclosure reduce transmission delays for communication devices, such as user devices (UEs) and/or base stations, that transmit timer-triggered messages over shared carriers. As the term is used herein, and depending on the implementation, a "carrier" may be any type of contiguous or non-contiguous frequency spectrum or band, and may or may not correspond to a single channel in a given radio access network. Moreover, as the term is used herein and depending on the implementation, a "shared" carrier may be an unlicensed carrier that can be shared by different radio access networks and/or radio access technologies, or a carrier that is shared for some other reason (e.g., a carrier shared exclusively by the devices of a single radio access network).

These techniques are discussed below primarily with reference to 5G NR technologies, and more specifically with reference to operation of the 5G NR network over an unlicensed carrier (i.e., NR-U operation). However, the techniques of this disclosure can apply to other radio access technologies, and/or to other types of shared carriers (e.g., licensed bands that are shared by devices of a single radio access network).

Figure 1:
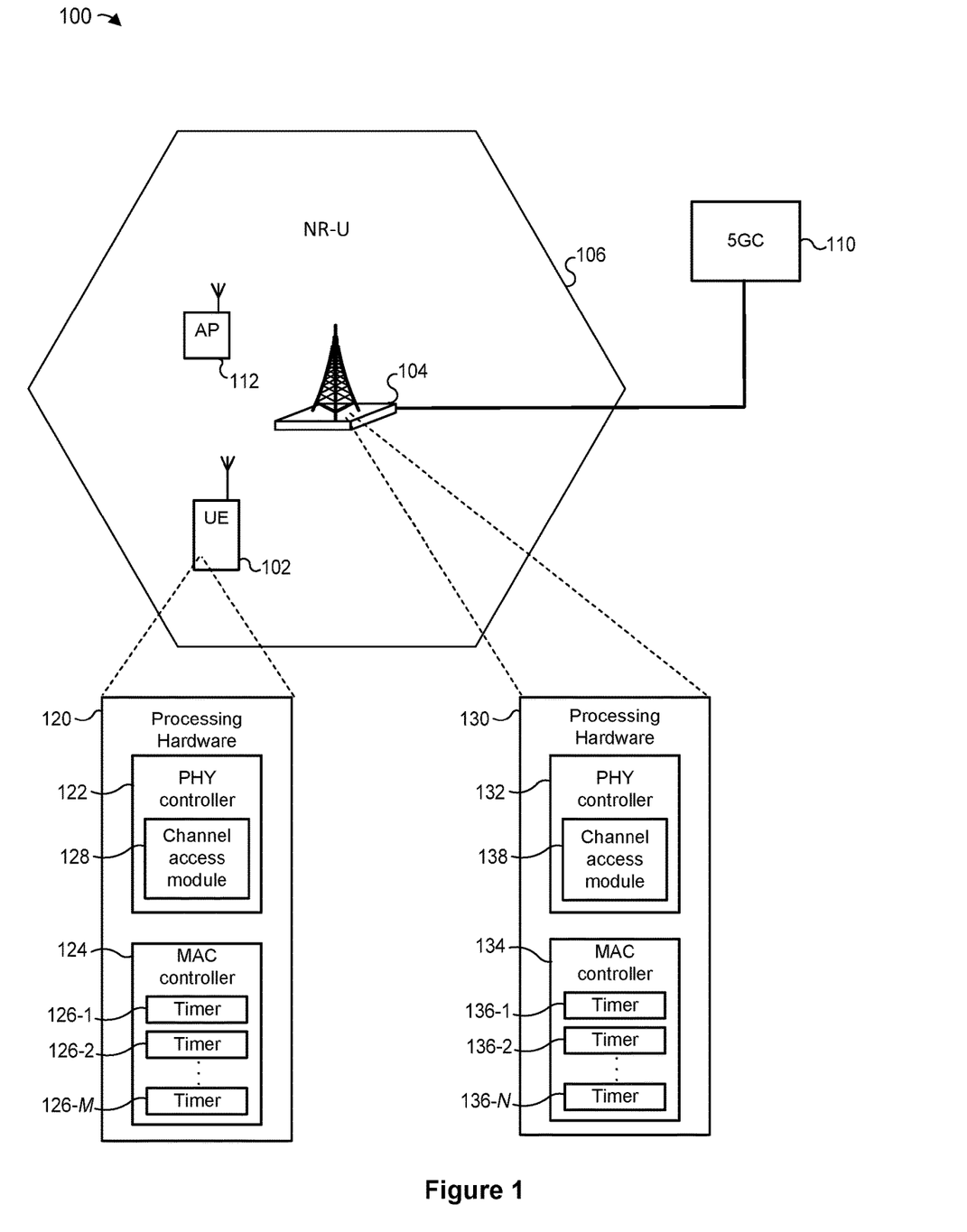
FIG. 1 is a block diagram of an example wireless communication network in which a user device and/or a base station of this disclosure use an unlicensed carrier for the transmission of various timer-triggered messages.

Referring first to FIG. 1, a wireless communication network 100 includes a UE 102, which can be any suitable device capable of wireless communications, as further discussed below. The wireless communication network 100 also includes a base station 104 associated with an NR-U cell 106 and connected (directly or indirectly) to a 5G core network (5GC) 110. The base station 104 may operate as a 5G Node B (gNB), a distributed unit gNB (gNB-DU), or an integrated access backhaul (IAB) node, for example. While FIG. 1 depicts the base station 104 as serving only the cell 106, it is understood that the base station 104 may also cover one or more additional cells not shown in FIG. 1. In general, the wireless communication network 100 can include any number of base stations, and each of the base stations may cover one, two, three, or any other suitable number of cells.

5G NR UEs operating in the cell 106, including the UE 102, can utilize an unlicensed carrier as well as portions of the radio spectrum allocated specifically to the service provider that operates the base station 104 and the 5GC 110. When exchanging data using the 5G NR air interface, the UE 102 and base station 104 may share the unlicensed carrier with other devices of other radio access networks. For example, other UEs (not shown in FIG. 1) may be subscribers of the service provider that operates the base station 104 and the 5GC 110, and be capable of communicating with the base station 104 via the unlicensed carrier. In addition, or alternatively, other UEs utilizing the unlicensed carrier may communicate with a base station or network node other than the base station 104, using a different radio access technology. FIG. 1 shows an example of one such scenario, in which the UE 102 and base station 104 coexist with an access point (AP) 112. The AP 112 can utilize spectrum that includes, or is included within, at least a portion of the unlicensed carrier when operating in a wireless local area network (WLAN) according to one of IEEE 802.11 standards. The AP 112 may be configured to communicate with one or more other devices not shown in FIG. 1, such as other UEs, for example. In other implementations and/or scenarios, the UE 102 and base station 104 also, or instead, coexist with devices operating according to other radio access technologies. In still another implementation and/or scenario, the base station 104 does not connect to the 5GC110, and can operate as an AP (e.g., similar to AP 112). Thus, for example, the wireless communication network 100 may omit the 5GC 110, or only use the 5GC 110 in certain scenarios.

The UE 102 is equipped with processing hardware 120, which may include one or more general-purpose processors (e.g., CPUs) and a non-transitory computer-readable memory storing instructions that the one or more general-purpose processors can execute. Additionally or alternatively, the processing hardware 120 may include special-purpose processing units, such as a wireless communication chipset, for example. The processing hardware 120 includes a physical (PHY) layer controller 122 (also referred to herein as "PHY controller 122") and a medium access control (MAC) layer controller 124 (also referred to herein as "MAC controller 124"). The PHY controller 122 and the MAC controller 124 may be implemented using any suitable combination of hardware, software, and/or firmware. In one example implementation, the PHY controller 122 and/or MAC controller 124 includes a set of instructions that defines respective components of the operating system of the UE 102, and one or more CPUs of the processing hardware 120 execute these instructions to perform the respective PHY and/or MAC layer functions. In another implementation, the PHY controller 122 and/or MAC controller 124 is implemented using firmware as a part of a wireless communication chipset.

Generally, the PHY controller 122 performs operations corresponding to a PHY layer of a wireless communication protocol stack supported by the UE 102, while the MAC controller 124 performs operations corresponding to a MAC layer of the same protocol stack. While not shown in FIG. 1, the processing hardware 120 may also include a controller for each of a number of other protocol layers, such as a radio link control (RLC) layer controller, a radio resource control (RRC) controller, and/or a mobility management (MM) controller, for example. Each of the controllers 122 and 124 (and possibly other layer-specific controllers in the UE 102) is responsible for inbound messaging, outbound messaging, and internal procedures at the corresponding layer of the protocol stack. In addition to supporting messaging external to the UE 102, the controllers 122 and 124 (and possibly other layer-specific controllers in the UE 102) can send internal, "inter-protocol layer" (IPL) messages to each other and/or other layers. As used herein, the terms "communicate" and "send" include reference to the exchange of information between layers of a wireless communication protocol stack, with the communicating/sending layer being the information source and the receiving layer being the information destination.

The MAC controller 124 implements (e.g., starts, and indicates the expiration of) a number of timers 126-1 through 126-M, where M may be any suitable integer greater than zero, depending on the implementation. The timers 126-1 through 126-M include timers of one or more types. For example, timers 126-1 through 126-M may include one or more periodic timers that each trigger the transmission of a message of a particular type at fixed time intervals, and/or one or more retransmission timers that each trigger the retransmission of a message of a particular type (e.g., after failure to receive confirmation of an initial transmission of the message from the intended recipient). Moreover, in some implementations, timers 126-1 through 126-M may include one or more prohibit timers that each prevent, for the duration of the timer, transmission of a message of a particular type (e.g., overriding any periodic timer or retransmission timer that attempts to trigger transmission of that message). The timers 126-1 through 126-M may include the timers specified in 3GPP TS 38.321, TS 38.322, TS 38.331, and/or TS 24.501. In one implementation, for example, timers 126-1 through 126-M include the timers shown in the following table:

| Timer name | Message that may be triggered by expiration of the timer, or message that may be prohibited during running of the timer |
| --- | --- |
| periodicBSR-Timer | Buffer Status Report (BSR) control element (CE), or a MAC protocol data unit (PDU) including the BSR CE and a MAC sub-header for the BSR CE |
| retxBSR-Timer | BSR CE, or a MAC PDU including the BSR CE |
| logicalChannelSR-DelayTimer | Scheduling request (SR), or a random access preamble |
| phr-PeriodicTimer | Power headroom report (PHR) CE, or a MAC PDU including the PHR CE and a MAC sub-header for the PHR CE |
| phr-ProhibitTimer | PHR CE, or a MAC PDU including the PHR CE and a MAC sub-header for the PHR CE |

-continued

| Timer name | Message that may be triggered by expiration of the timer, or message that may be prohibited during running of the timer |
| --- | --- |
| configuredGrantTimer | MAC PDU including at least one MAC sub-PDU |
| sr-ProhibitTimer | SR, or a random access preamble |
| T-PollRetransmit | Radio link control (RLC) Data PDU |
| t-StatusProhibit | RLC Status PDU |
| T380 (periodic Radio Access Network (RAN)-based Notification Area timer) | RRCResumeRequest or RRCResumeRequest 1 message |
| T3502 | Registration Request message |
| T3511 | Registration Request message |
| T3512 | Registration Request message |
| T3521 | Deregistration Request message |
| T3580 | PDU Session Establishment Request message |
| T3581 | PDU Session Modification Request message |
| T3582 | PDU Session Modification Release Request message |

In an alternative implementation, the UE 102 implements the timers 126-1 through 126-M, or a subset thereof, at a different protocol layer. For example, an RLC layer controller, RRC layer controller, and/or a mobility management (MM) or other non-access stratum (NAS) layer controller (e.g., Session Management (SM) controller) of processing hardware 120 may implement one, some, or all of the timers 126-1 through 126-M.

The PHY controller 122 includes a channel access module 128, which causes the UE 102 to execute one or more channel access procedures that ensure fair access to the unlicensed carrier (e.g., such that the UE 102 does not over-utilize the unlicensed carrier and cause undue interference with communications between other devices, such as the AP 112 and another UE). In particular, the channel access module 128 causes the UE 102 to execute a listen-before-talk (LBT) procedure prior to the UE 102 transmitting a message over the unlicensed carrier. Generally, the UE 102 may transmit a message over the unlicensed carrier if an LBT procedure indicates that the unlicensed carrier is idle, but cannot transmit the message over the unlicensed carrier until a later time if the LBT procedure indicates that the unlicensed carrier is busy.

The LBT procedure may include sensing (i.e., attempting to detect) energy on the unlicensed carrier for a fixed or variable amount of time (e.g., as specified in 3GPP TS 37.213 and/or TS 38.899). For example, for some or all LBT procedures, the channel access module 128 may sense energy on the unlicensed carrier for a 25 microsecond time interval, or for any other suitable, fixed time interval. As another example, for some or all LBT procedures, the channel access module 128 may dynamically determine and set the duration of a "contention window" over which the unlicensed carrier must be idle in order for the UE 102 to consider the unlicensed carrier as being available (i.e., in order for UE 102 to transmit a particular message on the unlicensed carrier). The channel access module 128 may dynamically determine the contention window duration/size by randomly generating a number between lower and upper limits, for example. In some implementations and scenarios, the channel access module 128 may determine that a particular LBT procedure is to have no contention window at all, to avoid delaying the transmission of certain messages.

In some implementations, the channel access module 128 can selectively implement LBT procedures of different durations, types, and/or categories. For example, the channel access module 128 may utilize different contention window durations, or constrain the contention window duration to a different range of values, based on a priority class of the message that the UE 102 intends to transmit. As another example, the channel access module 128 may selectively implement a Category 1, 2, 3 or 4 channel access scheme as specified in 3GPP TS 38.899 (i.e., no LBT procedure, an LBT procedure with random back-off, an LBT procedure with random back-off and a contention window of fixed size/duration, or an LBT procedure with random back-off and a contention window of variable size/duration, respectively). Operation of the channel access module 128, in scenarios where the UE 102 transmits (or intends to transmit) a message that is triggered by one of the timers 126-1 through 126-M over the unlicensed carrier, is discussed in further detail below.

The base station 104 is equipped with processing hardware 130, which may include one or more general-purpose processors (e.g., CPUs) and a non-transitory computer-readable memory storing instructions that the one or more general-purpose processors can execute. Additionally or alternatively, the processing hardware 130 may include special-purpose processing units, such as a wireless communication chipset, for example. Similar to the processing hardware 120 of UE 102, the processing hardware 130 includes a PHY controller 132 and a MAC controller 134, with the MAC controller 134 implementing (e.g., starting, and indicating the expiration of) a number of timers 136-1 through 136-N (N being an integer greater than zero), and the PHY controller 132 including a channel access module 138. In an alternative implementation, the base station 104 implements the timers 136-1 through 136-N, or some subset thereof, at a different protocol layer. For example, an RLC layer controller, RRC layer controller, and/or NAS layer controller of processing hardware 130 may implement one, some, or all of the timers 136-1 through 136-N.

Generally, the PHY controller 132 may be similar to the PHY controller 122 and the MAC controller 134 may be similar to the MAC controller 124, but with the operation of PHY controller 132 and MAC controller 134 corresponding to the base station side of the PHY and MAC layers rather than the UE side of the PHY and MAC layers. Thus, for example, the timers 136-1 through 136-N may consist of more or fewer timers than timers 126-1 through 126-M, and/or may correspond to (i.e., be used to trigger or prohibit) different types of messages than timers 126-1 through 126-M. As another example, the channel access module 138 may implement different types, categories, and/or durations of LBT procedures as compared to channel access module 128, in some implementations. Operation of the channel access module 138, in scenarios where the base station 104 transmits (or intends to transmit) a message that is triggered by one of the timers 136-1 through 136-N over the unlicensed carrier, is discussed in further detail below. While not shown in FIG. 1, the processing hardware 130 may also include a controller for each of a number of other layers, such as an RLC layer controller, an RRC layer controller, and/or an MM or other NAS layer controller (e.g., SM controller), any one or more of which may implement one, some, or all of the timers 136-1 through 136-N. In one implementation, for example, timers 136-1 through 136-N include the timers shown in the following table:

| Timer name | Message that may be triggered by expiration of the timer, or message that may be prohibited during running of the timer |
|---|---|
| Inactivity timer | RRC Release message |
| drx-RetransmissionTimer | A downlink assignment for downlink retransmission or an uplink grant for uplink retransmission |
| drx-HARQ-RTT-Timer | A downlink assignment for downlink retransmission or new transmission or an uplink grant for uplink retransmission or new transmission |
| T-PollRetransmit | Radio link control (RLC) Data PDU |
| t-StatusProhibit | RLC Status PDU |
| T3550 | Registration Accept message |
| T3560 | Authentication Request message or Security Mode Command message |
| T3570 | Identity Request message |
| T3513 | Paging message or a downlink control information (DCI) |
| T3522 | Deregistration Request message |
| T3555 | Configuration Update Command message |
| T3565 | Notification message |
| T3590 | PDU Session Authentication Command message |
| T3591 | PDU Session Modification Command message |
| T3592 | PDU Session Release Command message |
| T3593 | PDU Session Modification Complete message |

For simplicity, FIG. 1 does not depict various components of the UE 102 and the base station 104. In addition to the layer-specific controllers mentioned above, for example, the UE 102 and the base station 104 include respective transceivers, which comprise various hardware, firmware, and/or software components configured to transmit and receive wireless signals. The processing hardware 120 and the processing hardware 130 can send commands and exchange information with the respective transceivers as needed to perform various connection establishment procedures, perform various RRC, MM or SM procedures, or communicate with other network elements, etc.

Generally, if the UE 102 or base station 104 intends to transmit a message over the unlicensed carrier, the channel access module 128 or channel access module 138, respectively, may cause the respective device (UE 102 or base station 104) to perform an LBT procedure, and does not permit the respective device to transmit the message unless and until the LBT procedure indicates that the unlicensed carrier is idle. If the message is one that is triggered by a timer (i.e., one of timers 126-1 through 126-M or 136-1 through 136-N), however, the respective channel access module may perform a modified channel access technique that, in at least some scenarios, reduces the transmission delay for the message. That is, the modified channel access technique allows the UE 102 or base station 104 to, in at least some scenarios, transmit a message at a time that is closer to the expiration of the timer used to trigger that message, rather than delaying the transmission by the full duration of an LBT procedure.

FIGS. 2 through 5 illustrate operation of this modified channel access technique, according to various implementations and/or scenarios. Although FIGS. 2 through 5 are discussed below with reference to the components depicted in FIG. 1, in general any suitable components or wireless communication network may be used, and the channel access procedures need not be LBT procedures. Moreover, in some implementations, the following operations may apply only to the UE 102 and not the base station 104, or only to the base station 104 and not the UE 102.

Figure 2:
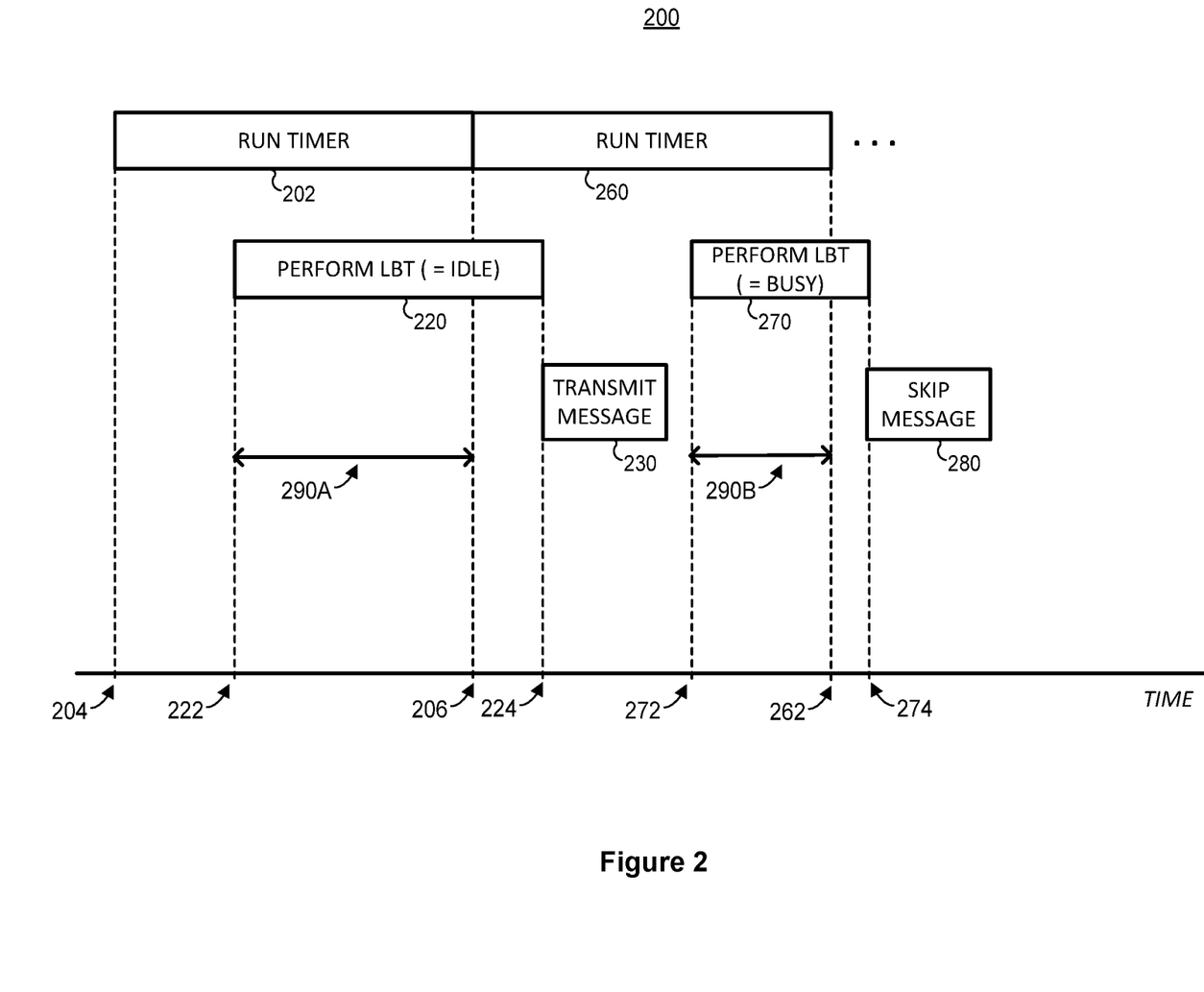
FIG. 2 is a timing diagram depicting an example channel access technique that may be implemented by the user device or base station of FIG. 1 for timer-triggered messages, according to a first scenario in which the timer expires before completion of a first LBT procedure.

Referring first to FIG. 2, a communication device, which may be either the UE 102 or the base station 104 of FIG. 1, implements an example channel access technique 200. In the channel access technique 200, the communication device runs 202 a timer (e.g., one of timers 126-1 through 126-M or 136-1 through 136-N) that starts at a time 204 and ends/expires at a time 206. In some implementations and/or scenarios, the communication device sets the duration of the timer using a timer value that the communication device had received from another communication device (e.g., from the base station 104, if the device implementing the technique 200 is the UE 102). A channel access module of the communication device (e.g., channel access module 128 or 138) performs 220 an LBT procedure starting at a time 222 that is earlier than the expiration time 206. The LBT procedure may be any of the LBT procedures discussed above in connection with FIG. 1 (e.g., utilizing a single contention window of fixed or variable duration), for example.

In the example scenario of FIG. 2, the LBT procedure ends at a time 224, and indicates that the unlicensed carrier is idle. Because the timer has already expired by the time the communication device determines that the carrier is idle, the communication device transmits 230 a message to the intended recipient device (e.g., to the base station 104, a wireless relay, or another UE, if the device implementing the technique 200 is the UE 102; or to the UE 102, a wireless relay, or another base station if the device implementing the technique 200 is the base station 104). The message may be a message that specifically corresponds to the timer that expired at time 206. For example, the timer may be any of the timers listed in the above table (e.g., a periodicBSR-Timer), and the message may be the corresponding message listed in the above tables (e.g., a Buffer Status Report (BSR) message). If the LBT procedure instead indicates that the unlicensed carrier is busy, the communication device implementing the technique 200 skips the transmission 230 of the message.

In the example of FIG. 2, the timer is a periodic timer. Accordingly, the communication device again runs 260 the timer immediately after the previous expiration time 206 of the timer. In other scenarios (e.g., if the timer is a retransmission timer rather than a periodic timer), the timer may not repeat immediately after the expiration time 206. The second run 260 of the timer expires at a time 262, and a channel access module of the communication device (e.g., channel access module 128 or 138) performs 270 another LBT procedure starting at a time 272 that is before the expiration time 262. While FIG. 2 shows this second LBT procedure as having a shorter duration than the first LBT procedure, in other implementations and/or scenarios the second LBT procedure may have a duration that is the same as, or longer than, the duration of the first LBT procedure.

In the depicted scenario, the second LBT procedure ends at a time 274 that is after the expiration time 262. If the second LBT procedure indicates that the unlicensed carrier is idle, the communication device implementing the technique 200 transmits a second instance of the message (e.g., transmits a second BSR message for the second time period). In the scenario of FIG. 2, however, the second LBT procedure indicates that the unlicensed carrier is busy. Thus, despite the timer having already expired at time 262, the communication device skips 280 transmission of the message (e.g., does not transmit a second BSR message for the second time period).

The communication device may determine to skip a transmission of a message (or not) depending on one or more conditions. In one example implementation and/or scenario, the communication device skips a transmission of a message if the communication device misses an intended transmission time of the message, or if the LBT procedure indicates that the unlicensed carrier has been busy within an intended transmission time range. Otherwise, the communication device may wait until the LBT procedure indicates the unlicensed carrier is idle to transmit the message. In another example, the communication device skips a transmission of a message if the communication device cancels or aborts a corresponding procedure triggering the transmission of the message.

As seen in FIG. 2, the start time 222 of the first LBT procedure precedes the first expiration time 206 by a duration 290A, and the start time 272 of the second LBT procedure precedes the second expiration time 262 by a duration 290B. In some implementations, the communication device determines each LBT procedure start time (and thus, durations 290A and 290B) based on a priority class associated with the message being sent. For example, the communication device may set an earlier start time for an LBT procedure when desiring to transmit a higher-priority message. In other implementations, the communication device determines each LBT procedure start time based on the size/duration of a contention window to be used for that LBT procedure, with the communication device selecting earlier start times for longer contention windows. For example, FIG. 2 may reflect a scenario in which the communication device randomly set a longer contention window size/duration for the first LBT procedure than the second LBT procedure, and therefore set the LBT procedure start times 222 and 272 such that duration 290A is longer than duration 290B. In still other implementations, the durations 290A and 290B are both equal to a predetermined/fixed time interval that the communication device uses when performing an LBT procedure for transmission of a timer-triggered message, or the communication device may use any other suitable technique or rule to determine the LBT procedure start times 222 and 272.

Figure 3:
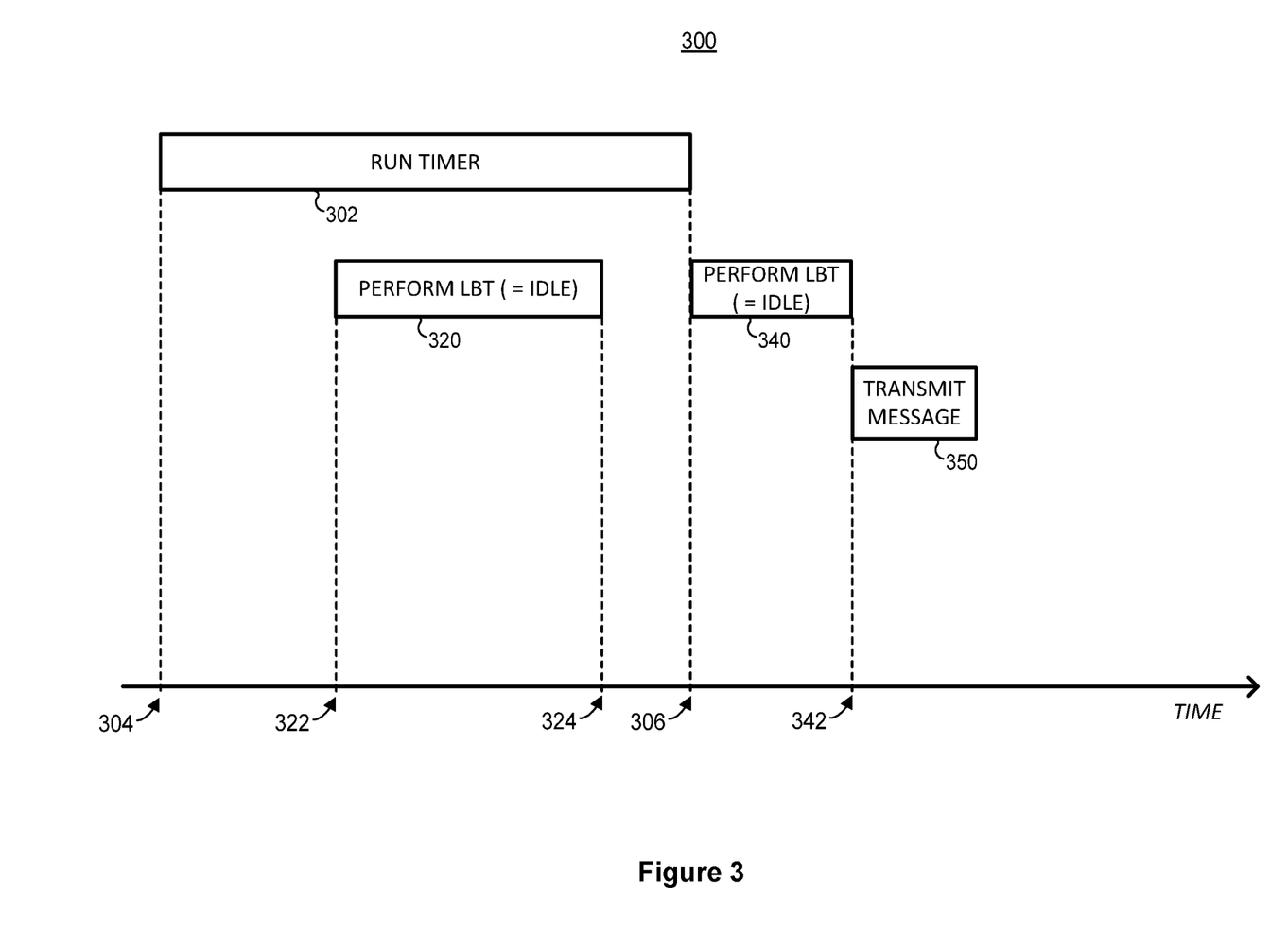
FIG. 3 is a timing diagram depicting the channel access technique of FIG. 2, according to a second scenario in which the timer expires after completion of the first LBT procedure.

FIG. 3 depicts a different scenario in which an LBT procedure of an example channel access technique 300 ends before the expiration of a corresponding timer, and therefore cannot be trusted as an indicator of whether the unlicensed carrier is still idle/available at the desired transmission time. The channel access technique 300 may be implemented by the same communication device as the channel access technique 200 (e.g., the UE 102 or base station 104 of FIG. 1), for example. In the channel access technique 300, the communication device runs 302 a timer (e.g., one of timers 126-1 through 126-M or 136-1 through 136-N) that starts at a time 304 and ends/expires at a time 306. In some implementations and/or scenarios, the communication device sets the duration of the timer using a timer value that the communication device had received from another communication device (e.g., from the base station 104 if the device implementing the technique 300 is the UE 102). A channel access module of the communication device (e.g., channel access module 128 or 138) then performs 320 an LBT procedure starting at a time 322 that is earlier than the expiration time 306. The LBT procedure may be any one of the LBT procedures discussed above in connection with FIG. 1 or 2 (e.g., with a single contention window of fixed or variable duration), for example. Moreover, as was also discussed above in connection with FIG. 2, the communication device may determine the start time 322 of the first LBT procedure based on a priority class of the message to be sent, based on a contention window size/duration to be used for the LBT procedure, using a fixed time interval, or in any other suitable manner.

In the example scenario of FIG. 3, the LBT procedure ends at a time 324, and indicates that the unlicensed carrier is idle. Because the time 324 is before the expiration time 306, however, the communication device cannot safely assume that the unlicensed carrier is still idle at the expiration time 306. Thus, rather than immediately transmit a message, the communication device performs 340 a second LBT procedure starting at the expiration time 306. In other implementations, the second LBT procedure may start slightly after the expiration time 306 or, in order to further reduce delay, before the expiration time 306. For example, the communication device may perform 340 the second LBT procedure starting at time 324, at some other time that is later than the time 324, or at some other time that is earlier than the expiration time 306 by a known duration (or minimum duration) of the second LBT procedure.

If the second LBT procedure indicates the unlicensed carrier is busy, the communication device implementing the technique 300 may skip the transmission of the message. In the scenario depicted in FIG. 3, however, the second LBT procedure indicates that the unlicensed carrier is idle. Thus, when the second LBT procedure ends at time 342, the communication device transmits 350 a message to the intended recipient device (e.g., to the base station 104, a wireless relay, or another UE, if the device implementing the technique 300 is the UE 102; or to the UE 102, a wireless relay, or another base station if the device implementing the technique 300 is the base station 104). As discussed above in connection with FIG. 2, the message may be a message that specifically corresponds to the timer that expired at time 306 (e.g., in accordance with any of the timer/message pairs listed in the above tables).

In some implementations, the second LBT procedure is identical to the first LBT procedure. In other implementations, however, the second LBT procedure differs from the first LBT procedure in type, category, and/or duration. For example, the first and second LBT procedures may correspond to different categories (i.e., category 1, 2, 3, or 4) as defined in 3GPP TS 38.899. As another example, the first and second LBT procedures may correspond to different channel access procedures defined in 3GPP TS 37.213 (e.g., with the first procedure being a "type 1 uplink" channel access procedure and the second procedure being a "type 2 uplink" channel access procedure, etc.). As a more specific example, the first LBT procedure may be a variable-duration procedure (e.g., with a randomly determined contention window duration), and the second LBT procedure may be a shorter, fixed-duration procedure.

Depending on the implementation, the duration of the second LBT procedure may or may not depend on the results (idle or busy) of the first LBT procedure. In some implementations, for example, the communication device skips the transmission 350 of the message if the first LBT procedure indicates a busy carrier, without initiating the second LBT procedure. In other implementations, the communication device uses a relatively short second LBT procedure if the first LBT procedure indicates an idle channel, or a relatively long second LBT procedure (e.g., identical in duration to the first LBT procedure, or of variable/random duration, etc.) if the first LBT procedure indicates a busy channel.

In some implementations, the communication device implementing the technique 300 can cancel the transmission of a message before completing an LBT procedure, e.g., when aborting a certain procedure that had initiated the transmission. In one such implementation and/or scenario, when deciding to cancel a transmission, the communication device aborts any LBT procedure that is already in progress before its normal completion time (e.g., before time 324 if the first LBT procedure is in progress, or before time 342 if the second LBT procedure is in progress) in order to save power. In other implementations and/or scenarios, however, the communication device continues to execute any in-progress LBT procedure until its normal expiration time. The communication device may then use that LBT procedure for purposes of transmitting another message (e.g., a message of a different type, that also happens to have an upcoming timer expiration), thereby potentially reducing the transmission delay for that other message.

Figure 4:
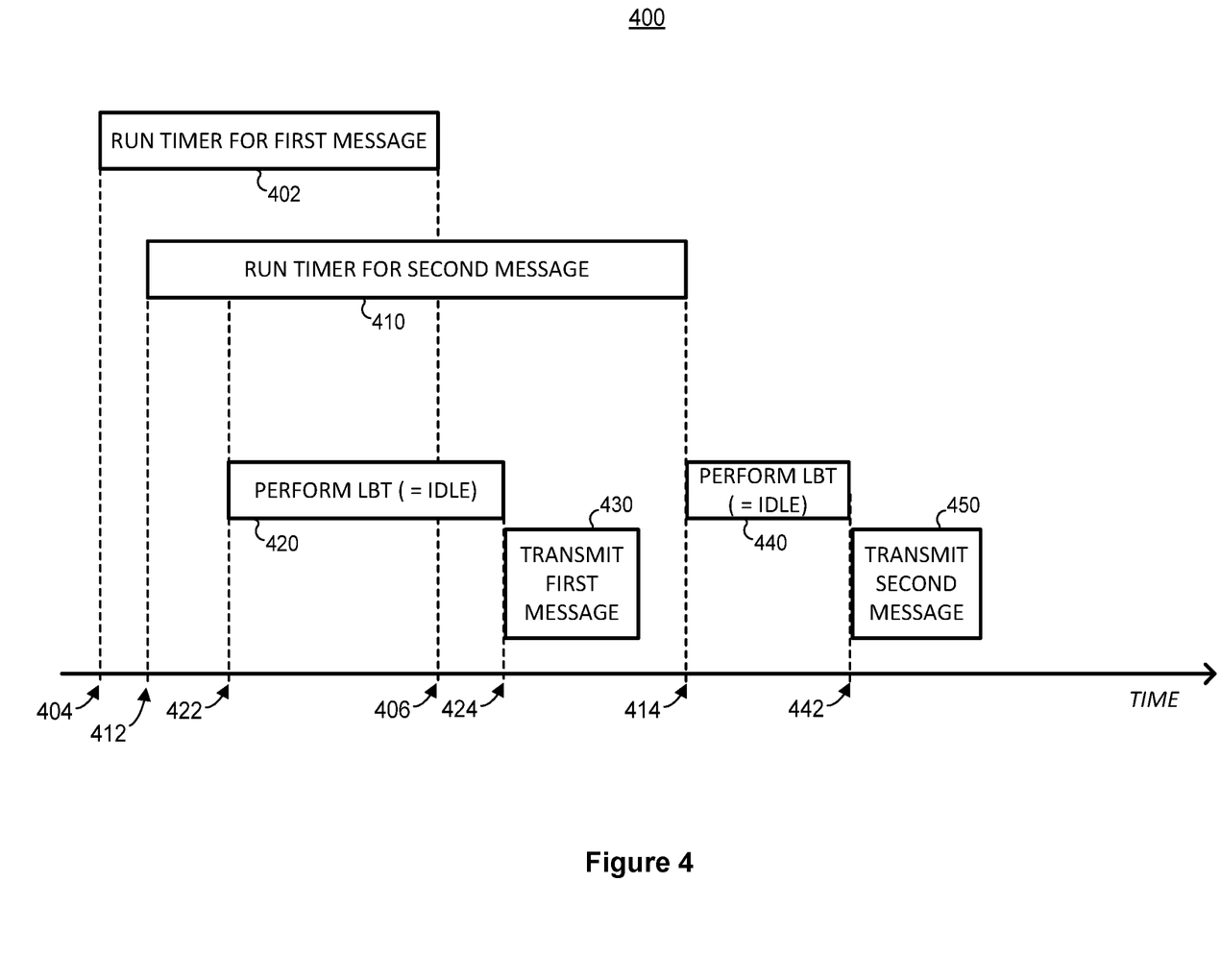
FIG. 4 is a timing diagram depicting an example channel access technique that may be implemented by the user device or base station of FIG. 1 for timer-triggered messages, according to an implementation and scenario in which the first LBT procedure is used to determine carrier availability for two messages associated with different timers.

FIG. 4 depicts an implementation and scenario in which the first LBT procedure of an example channel access technique 400 is used to determine carrier availability for multiple messages associated with different timers. The channel access technique 400 may be implemented by the same communication device as the channel access technique 200 and/or 300 (e.g., the UE 102 or base station 104 of FIG. 1), for example. In the channel access technique 400, the communication device runs 402 a first timer (e.g., one of timers 126-1 through 126-M or 136-1 through 136-N) that starts at a time 404 and ends/expires at a time 406, and runs 410 a second timer (e.g., a different one of timers 126-1 through 126-M or 136-1 through 136-N) that starts at a time 412 and ends/expires at a time 414. In some implementations and/or scenarios, the communication device sets the duration of one or both timers using timer values that the communication device had received from another communication device (e.g., from the base station 104 if the device implementing the technique 400 is the UE 102). In some implementations, the first timer specifically corresponds to a first message type, and the second timer specifically corresponds to a second, different message type. For example, the communication device may use the first timer to trigger buffer status report (BSR) messages and the second timer to trigger power headroom report (PHR) messages. In other implementations and/or scenarios, the first timer and the second timer can correspond to the same message type but for different recipient devices.

A channel access module of the communication device (e.g., channel access module 128 or 138) performs 420 a first LBT procedure starting at a time 422 that is earlier than both the expiration time 406 and the expiration time 414. The first LBT procedure may be any one of the LBT procedures discussed above in connection with FIG. 1 or 2 (e.g., with a single contention window of fixed or variable duration), for example. Moreover, as was also discussed above in connection with FIG. 2, the communication device may determine the start time 422 of the first LBT procedure based on a priority class of the message to be sent, based on a contention window size/duration to be used for the first LBT procedure, using a fixed time interval, or in any other suitable manner. The communication device may determine the start time 422 by calculating a time interval relative to the earlier of the two expiration times (i.e., time 406), for example.

In the example scenario of FIG. 4, the first LBT procedure ends at a time 424, and indicates that the unlicensed carrier is idle. Because the first timer has already expired (at time 406) by the time the communication device determines that the carrier is idle, the communication device transmits 430 a message to the intended recipient device (e.g., to the base station 104, a wireless relay, or another UE, if the device implementing the technique 200 is the UE 102; or to the UE 102, a wireless relay, or another base station if the device implementing the technique 400 is the base station 104). As noted above, the message may be a message that specifically corresponds to the timer that expired at time 406. If the first LBT procedure instead indicates that the unlicensed carrier is busy, the communication device implementing the technique 400 may skip the transmission 430 of the message.

Conversely, because the time 424 is before the expiration time 414 of the second timer, the communication device cannot safely assume that the unlicensed carrier is still idle at the expiration time 414. Thus, rather than immediately transmit a message corresponding to the second timer, the communication device performs 440 a second LBT procedure starting at the second timer expiration time 414. In other implementations, the second LBT procedure may start slightly after the expiration time 406 or, in order to further reduce delay, slightly before the expiration time 406 (e.g., as discussed above in connection with FIG. 3).

If the second LBT procedure indicates the unlicensed carrier is busy (or, in some implementations, if the first LBT procedure indicated the carrier is busy), the communication device implementing the technique 400 may skip transmission of the message corresponding to the second timer. In the scenario depicted in FIG. 4, however, the second LBT procedure indicates that the unlicensed carrier is idle. Thus, when the second LBT procedure ends at time 442, the communication device transmits 450 a message to the intended recipient device (e.g., the same device receiving the first message). The first and second LBT procedures may be identical, or may differ in type, category, and/or duration (e.g., as discussed above in connection with FIG. 3).

Generally, in some implementations, the principles underlying technique 400 may be expanded to any suitable number of timers and corresponding messages. For example, the communication device may use the first LBT procedure in order to check carrier availability for three (or four, five, etc.) timer-triggered messages of different types, and perform the second LBT procedure only if necessary (e.g., only if the first LBT procedure ended before one or more of the timers expired).

Figure 5:
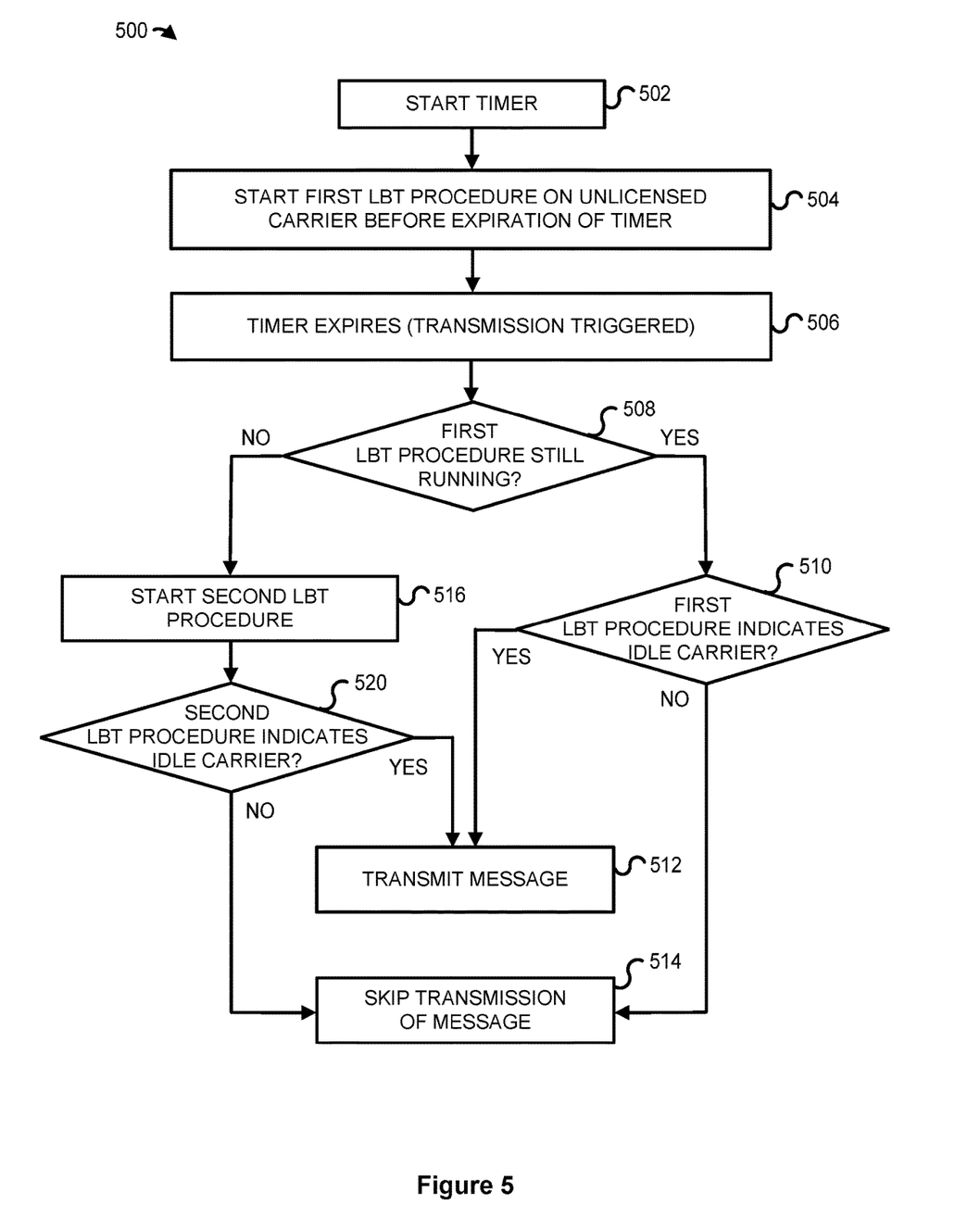
FIG. 5 is a flow diagram of an example algorithm for determining when to transmit a timer-triggered message.

FIG. 5 is a flow diagram of an example algorithm 500 for determining when to transmit a timer-triggered message. The algorithm 500 is implemented by a communication device, such as the UE 102 or base station 104 of FIG. 1. The scenarios reflected in FIGS. 2, 3, and/or 4 may correspond to different decision paths that are followed when the communication device applies the algorithm 500, for example.

In the algorithm 500, the communication device starts a timer at block 502 (e.g., the timer that starts at time 204 or 206 of FIG. 2, at time 304 of FIG. 3, at time 404 of FIG. 4, or at time 412 of FIG. 4). The timer may be one of timers 126-1 through 126-M or 136-1 through 136-N, for example. At block 504, the communication device starts a first LBT procedure on an unlicensed carrier (e.g., the LBT procedure starting at time 222 of FIG. 2, at time 322 of FIG. 3, or at time 422 of FIG. 4) before expiration of the timer.

At block 506, the timer started at block 502 expires (e.g., at time 206 or 262 of FIG. 2, at time 306 of FIG. 3, or at time 406 or 414 of FIG. 4), thereby triggering transmission of a message (subject to the availability of the carrier). At block 508, in response to the timer expiration, the communication device determines whether the first LBT procedure is still running. If the procedure is still running, flow proceeds to block 510.

At block 510, the communication device determines whether the first LBT procedure indicated that the carrier is idle. If idle, flow proceeds to block 512, where the communication device transmits a message (e.g., transmission 230 of FIG. 2, or transmission 430 of FIG. 4), which may be a message specific to the timer started at block 502. If not idle, flow proceeds to block 514, where the communication device skips transmission of the message.

If the communication device instead determines at block 508 that the first LBT procedure is not still running, flow proceeds to block 516, where the communication device starts a second LBT procedure (e.g., the LBT procedure starting at time 340 of FIG. 3 or at time 440 of FIG. 4). Thereafter, at block 520, the communication device determines whether the second LBT procedure indicated that the carrier is idle. If idle, flow proceeds to block 512, where the communication device transmits the message (e.g., transmission 350 of FIG. 3, or transmission 450 of FIG. 4). If not idle, flow proceeds to block 514, where the communication device skips transmission of the message. In some implementations, the communication device may not start the second LBT procedure, and transmits the message, if the first LBT procedure stops running immediately before the timer expires, or a short duration before the timer expires.

Figure 6:
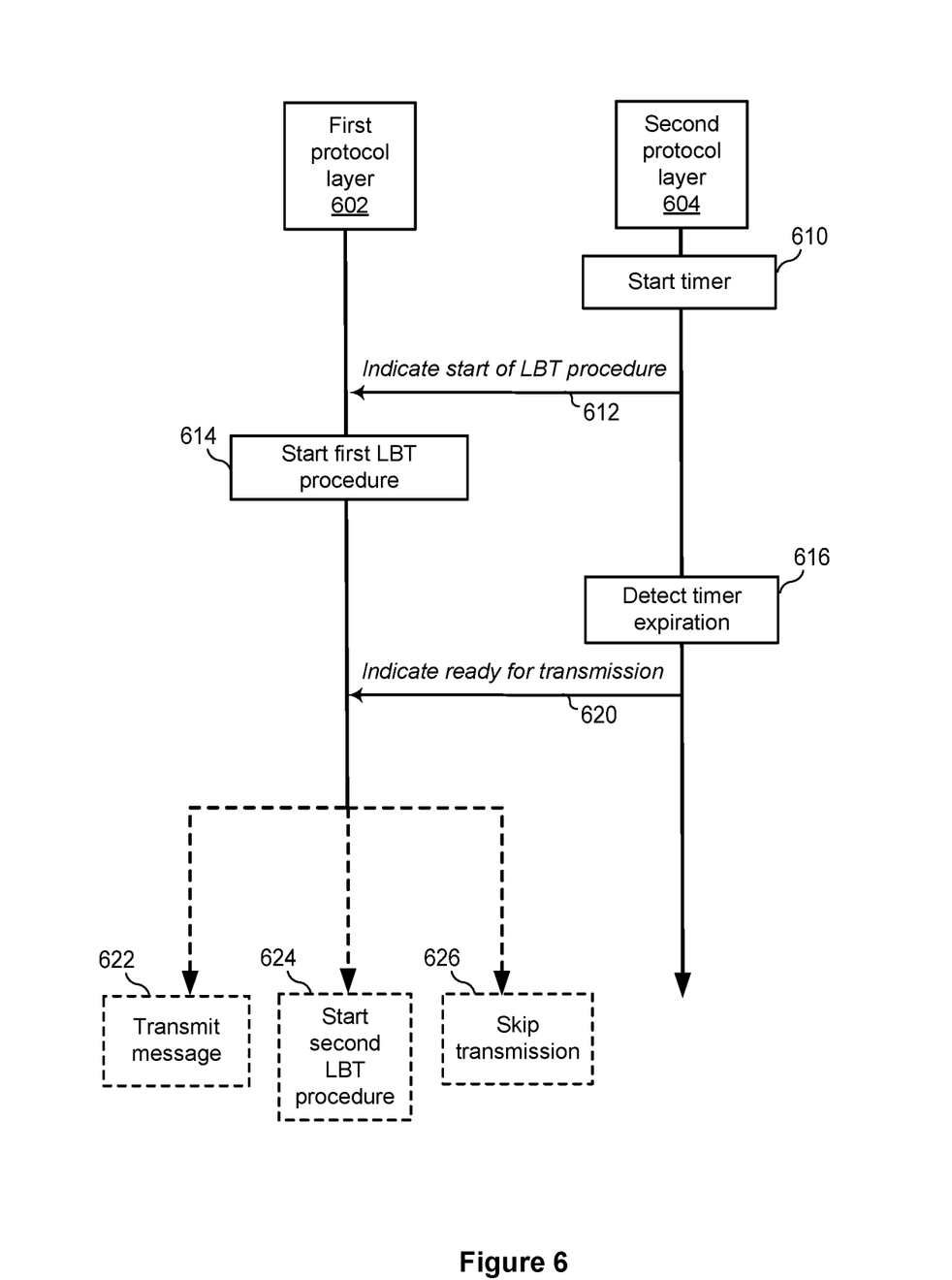
FIG. 6 depicts an example inter-protocol layer messaging sequence that may correspond to the channel access technique of any one of FIGS. 2 through 4 and/or the flow diagram of FIG. 5.

FIG. 6 depicts an example IPL messaging sequence 600 that may correspond to the channel access technique of any of FIGS. 2 through 4, and/or the flow diagram of FIG. 5, for example. More specifically, FIG. 6 depicts IPL messages that a communication device (e.g., the UE 102 or base station 104) exchanges between a first protocol layer 602 and a second protocol layer 604. The first protocol layer may be a PHY layer (e.g., as implemented by PHY controller 122 or 132 of FIG. 1) and the second protocol layer 604 may be a MAC layer (e.g., as implemented by MAC controller 124 or 134 of FIG. 1), an RLC layer, an RRC layer, or a NAS layer, for example.

In the IPL messaging sequence 600, the second protocol layer 604 starts 610 a timer (e.g., the timer started at time 204 or 206 of FIG. 2, at time 304 of FIG. 3, or at time 404 or time 412 of FIG. 4). The timer may be one of timers 126-1 through 126-M or 136-1 through 136-N, for example. Before expiration of the timer, the second protocol layer 604 sends 612 a first IPL message to the first protocol layer 602, implicitly or explicitly indicating that the first protocol layer 602 is to start a first LBT procedure (e.g., by sending a command to start the procedure, or simply by indicating that a transmission is coming soon). The second protocol layer 604 may determine when to send 612 the first IPL message in any of the ways discussed above in connection with FIG. 2 (e.g., based on a priority class of the message to be sent, or a fixed time interval, etc.).

In response to the IPL message, the first protocol layer 602 starts 614 the first LBT procedure (e.g., the LBT procedure starting at time 222 of FIG. 2, at time 322 of FIG. 3, or at time 422 of FIG. 4). Thereafter, the second protocol layer 604 detects 616 expiration of the timer (e.g., at time 206 or 262 of FIG. 2, at time 306 of FIG. 3, or at time 406 or 414 of FIG. 4).

In response to detecting 616 the timer expiration, the second protocol layer 604 sends 620 another IPL message to the first protocol layer 602, indicating that a message corresponding to the timer is ready for transmission. In response, the first protocol layer 602 either transmits 622 the message (i.e., if the first LBT procedure ended after the timer expiration and indicated that the carrier is idle), starts 624 a second LBT procedure (e.g., if the first LBT procedure ended before the timer expiration), or skips 626 the message transmission (e.g., if the first LBT procedure indicated that the carrier is busy). The first protocol layer 602 may determine which action (or non-action) to take (i.e., 622, 624, or 626) by applying the portion of the algorithm 500 that starts at block 508, for example.

In some implementations and/or scenarios, the second protocol layer 604 starts a scheduling request (SR) prohibit timer (e.g., sr-ProhibitTimer), and then triggers transmission of an SR (e.g., due to the expiration of another timer) while the SR prohibit timer is still running. The second protocol layer 604 also sends an IPL message to the first protocol layer 602, before expiration of the SR prohibit timer, indicating that the first protocol layer 602 is to start an LBT procedure. In response, the first protocol layer 602 starts a first LBT procedure. When the SR prohibit timer expires (e.g., as indicated in another IPL message from the second protocol layer 604), if the first protocol layer 602 has completed the first LBT procedure, the first protocol layer 602 performs a second LBT procedure and, if the second LBT procedure indicates that the carrier is idle, the first protocol layer 602 transmits an SR message to a recipient device. Conversely, if the first protocol layer 602 has not completed the first LBT procedure when the SR prohibit timer expires, the first protocol layer 602 completes the first LBT procedure. Thereafter, if the first LBT procedure indicates that the carrier is idle, the first protocol layer 602 transmits an SR message to the recipient device.

Figure 7:
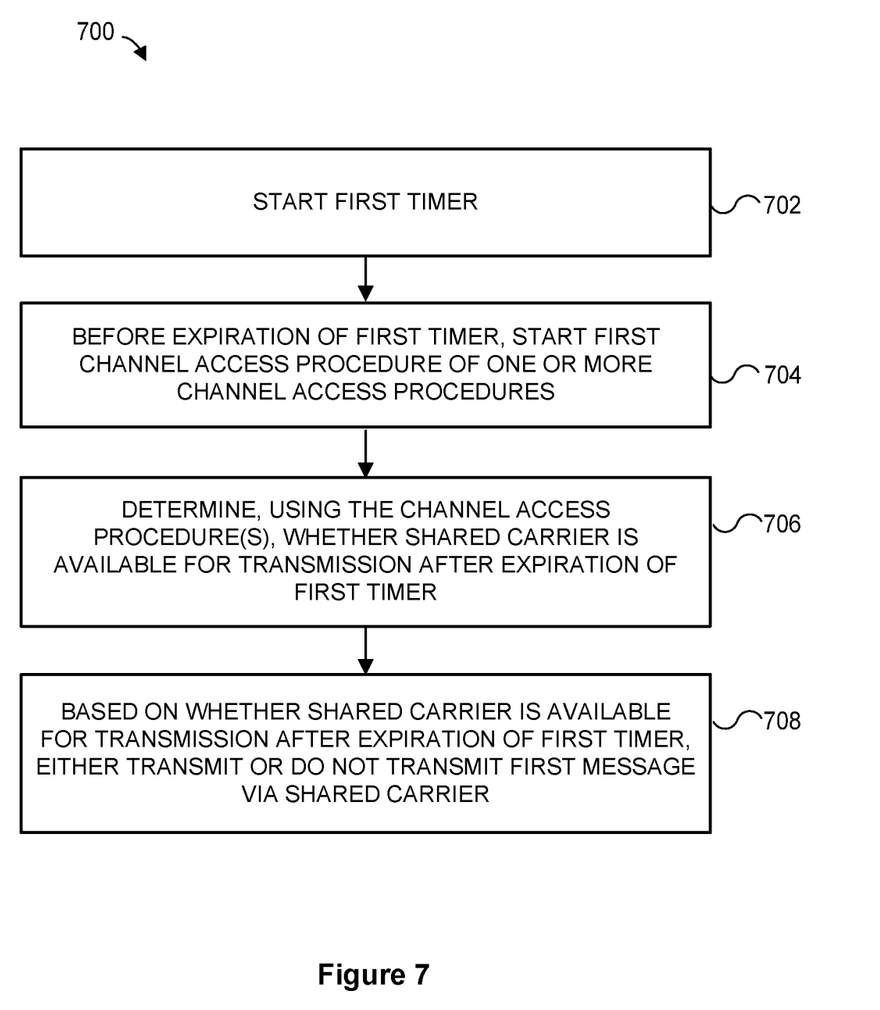
FIG. 7 is a flow diagram of an example method for reducing transmission delays.

Referring now to FIG. 7, an example method 700 for reducing transmission delays may be implemented in a suitable communication device, such as the UE 102 (e.g., by the processing hardware 120) or the base station 104 (e.g., by the processing hardware 130), for example.

At block 702 of the method 700, the communication device starts a first timer (e.g., one of timers 126-1 through 126-M or 136-1 through 136-N of FIG. 1, at time 204 of FIG. 2, time 304 of FIG. 3, or time 404 of FIG. 4). The expiration of the first timer corresponds to a desired transmission time for a first message (e.g., a BSR message, a PHR message, an SR message, a registration request message, a deregistration request message, or another suitable message). Block 702 may occur at a MAC layer, RLC layer, RRC layer, or NAS layer of a wireless communication protocol stack that is supported by the communication device, for example.

At block 704, before the expiration of the first timer (e.g., at time 206 of FIG. 2, time 306 of FIG. 3, or time 406 or 414 of FIG. 4), the communication device starts a first channel access procedure (e.g., the LBT procedure starting at time 222 of FIG. 2, at time 322 of FIG. 3, or at time 422 of FIG. 4), of one or more channel access procedures that the communication device ultimately performs in connection with the first timer (e.g., in some implementations/scenarios, only one LBT procedure as discussed above in connection with FIG. 2, or two LBT procedures as discussed above in connection with FIG. 3). In some implementations, block 704 includes determining a starting time for the first channel access procedure (e.g., based on a priority of the first message, a duration of the first channel access procedure, or a predetermined/fixed interval, etc., as discussed above in connection with FIG. 2), and then starting the procedure at that time. Block 704 may occur at a PHY layer of the wireless communication protocol stack (e.g., in response to receiving an IPL message from a protocol layer performing block 702), for example.

At block 706, the communication device determines, using the one or more channel access procedures, whether a shared carrier (e.g., an unlicensed carrier) is available for transmission after the expiration of the first timer. Block 706 may occur at the PHY layer of the wireless communication protocol stack, for example.

At block 708, based on the determination at block 706, the communication device either transmits the first message to another communication device via the shared carrier (e.g., transmission 230 of FIG. 2, transmission 350 of FIG. 3, or transmission 430 or 450 of FIG. 4), or does not transmit the first message (e.g., skips the transmission at least until a subsequent expiration of the timer or due to the abortion of a certain procedure that had triggered transmission of the first message). For example, if the communication device implementing the method 700 is the UE 102, the receiving device may be the base station 104, another UE, or a wireless relay. As another example, if the communication device implementing the method 700 is the base station 104, the receiving device may be the UE 102, another base station, or a wireless relay.

In some implementations and/or scenarios (e.g., as shown and described in connection with FIG. 2), block 706 includes determining that the shared carrier is available for transmission after the expiration of the first timer using the first channel access procedure, and block 708 includes, in response to that determination, transmitting the first message to the other communication device via the shared carrier (e.g., transmission 230 of FIG. 2).

In other implementations and/or scenarios (e.g., as shown and described in connection with FIG. 3), the method 700 includes a first additional block in which the communication device determines that the first channel access procedure ended before the expiration of the first timer, and a second additional block in which the communication device starts a second one of the one or more channel access procedures (e.g., the LBT procedure starting at time 306 of FIG. 3 or at time 414 of FIG. 4). In such an implementation/scenario, block 706 may include determining that the shared carrier is available for transmission after the expiration of the first timer using the second channel access procedure, and block 708 may include, in response to that determination, transmitting the first message to the other communication device via the shared carrier (e.g., transmission 350 of FIG. 3 or transmission 450 of FIG. 4).

In still other implementations and/or scenarios, block 706 includes determining that the shared carrier is not available for transmission after the expiration of the first timer (e.g., using the first or a second channel access procedure), and block 708 includes, in response to that determination, not transmitting the first message to the other communication device via the shared carrier.

In still other implementations and/or scenarios (e.g., as shown and described in connection with FIG. 4), the method 700 includes a first additional block in which the communication device starts a second timer (e.g., the timer starting at time 412 of FIG. 4, if the first timer is the timer starting at time 402, or vice versa), with an expiration of the second timer corresponding to a desired transmission time for a second message (e.g., a message of a different type than the first message). In this implementation/scenario, block 704 (i.e., starting the first channel access procedure) occurs before expiration of both the first timer and the second timer. The method 700 may also include a second additional block in which the communication device determines, using the one or more channel access procedures, whether the shared carrier is available for transmission after expiration of the second timer, and a third additional block in which, based on that determination, the communication device either transmits (e.g., transmission 430 or 450 of FIG. 4) or does not transmit the second message to the other communication device via the shared carrier, e.g., in accordance with the algorithm 500 of FIG. 5.

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain implementations are described in this disclosure as including logic or a number of components or modules. Modules may can be software modules (e.g., code stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate, through the principles disclosed herein, still additional alternative structural and functional designs for reducing transmission delays for timer-triggered messages transmitted over a shared carrier. Thus, while particular implementations and applications have been illustrated and described, it is to be understood that the disclosed implementations are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

What is claimed is:

1. A method, in a communication device, for reducing transmission delays, the method comprising:
    starting, by the communication device, a first timer, wherein an expiration of the first timer corresponds to a desired transmission time for a first message;
    after starting the first timer and before the expiration of the first timer, starting, by the communication device, a first channel access procedure of one or more channel access procedures;
    determining, by the communication device and using the one or more channel access procedures, whether a shared carrier is available for transmission after the expiration of the first timer; and
    based on whether the shared carrier is available for transmission after the expiration of the first timer, either transmitting or not transmitting the first message to another communication device via the shared carrier, including
        in a first instance when determining that the shared carrier is available for transmission after the expiration of the first timer, transmitting the first message to the other communication device via the shared carrier, and
        in a second instance when determining that the shared carrier is not available for transmission after the expiration of the first timer, not transmitting the first message to the other communication device via the shared carrier.

2. The method of claim 1, wherein:
    determining whether the shared carrier is available for transmission after the expiration of the first timer includes determining that the shared carrier is available for transmission after the expiration of the first timer using the first channel access procedure; and
    the method comprises, in response to determining that the shared carrier is available for transmission after the expiration of the first timer, transmitting the first message to the other communication device via the shared carrier.

3. The method of claim 1, further comprising:
    determining, by the communication device, that the first channel access procedure ended before the expiration of the first timer; and
    starting, by the communication device, a second channel access procedure of the one or more channel access procedures,
    wherein determining whether the shared carrier is available for transmission after the expiration of the first timer includes determining that the shared carrier is available for transmission after the expiration of the first timer using the second channel access procedure, and
    wherein the method comprises, in response to determining that the shared carrier is available for transmission after the expiration of the first timer, transmitting the first message to the other communication device via the shared carrier.

4. The method of claim 3, wherein:
    the second channel access procedure is shorter than the first channel access procedure; or
    the first channel access procedure has a variable duration and the second channel access procedure has a fixed duration.

5. The method of claim 1, wherein:
    the shared carrier is an unlicensed spectrum; and
    each of the one or more channel access procedures utilizes an energy detection technique to determine whether the shared carrier is idle.

6. The method of claim 1, wherein starting the first channel access procedure includes:
    determining a starting time for the first channel access procedure; and
    starting the first channel access procedure at the starting time.

7. The method of claim 6, wherein determining the starting time includes:
    (i) determining the starting time based on a priority associated with the first message;
    (ii) determining a duration of the first channel access procedure, and determining the starting time based on the determined duration; or
    (iii) setting the starting time to be a predetermined time interval before the expiration of the first timer.

8. The method of claim 1, further comprising:
    starting, by the communication device, a second timer, wherein an expiration of the second timer corresponds to a desired transmission time for a second message, and wherein starting the first channel access procedure occurs before the expiration of the second timer;
    determining, by the communication device and using the one or more channel access procedures, whether the shared carrier is available for transmission after the expiration of the second timer; and
    based on whether the shared carrier is available for transmission after the expiration of the second timer, either transmitting or not transmitting the second message to the other communication device via the shared carrier.

9. The method of claim 8, wherein:
    determining whether the shared carrier is available for transmission after the expiration of the first timer includes determining that the shared carrier is available for transmission after the expiration of the first timer using the first channel access procedure;
    the method comprises, in response to determining that the shared carrier is available for transmission after the expiration of the first timer, transmitting the first message to the other communication device via the shared carrier;

the method further comprises determining, by the communication device, that the first channel access procedure ended before the expiration of the second timer;

the method further comprises starting, by the communication device and before the expiration of the second timer, a second channel access procedure of the one or more channel access procedures;

determining whether the shared carrier is available for transmission after the expiration of the second timer includes determining that the shared carrier is available for transmission after the expiration of the second timer using the second channel access procedure; and the method further comprises, in response to determining that the shared carrier is available for transmission after the expiration of the second timer, transmitting the second message to the other communication device via the shared carrier.

10. The method of claim 1, wherein:
the communication device is a user device;
the other communication device is a base station; and
the first message is one of (i) a buffer status report message, (ii) a scheduling request message, (iii) a power headroom report message, (iv) a registration request message, or (v) a deregistration request message.

11. The method of claim 1, wherein:
the communication device is a base station; and
the other communication device is a user device or another base station.

12. The method of claim 1, wherein:
starting the first channel access procedure, and determining whether the shared carrier is available for transmission after the expiration of the first timer, occur at a first protocol layer supported by the communication device; and
starting the first timer occurs at a second protocol layer supported by the communication device, the second protocol layer being different than the first protocol layer.

13. The method of claim 12, wherein starting the first channel access procedure includes starting the first channel access procedure in response to the first protocol layer receiving an inter-protocol layer message from the second protocol layer.

14. A communication device comprising processing hardware and configured to:
start a first timer, wherein an expiration of the first timer corresponds to a desired transmission time for a first message;
after starting the first timer and before the expiration of the first timer, start a first channel access procedure of one or more channel access procedures;
determine, using the one or more channel access procedures, whether a shared carrier is available for transmission after the expiration of the first timer; and
based on whether the shared carrier is available for transmission after the expiration of the first timer, either transmit or not transmit the first message to another communication device via the shared carrier, including
in a first instance when determining that the shared carrier is available for transmission after the expiration of the first timer, transmitting the first message to the other communication device via the shared carrier, and
in a second instance when determining that the shared carrier is not available for transmission after the expiration of the first timer, not transmitting the first message to the other communication device via the shared carrier.

15. The communication device of claim 14, wherein the communication device is further configured to:
when determining, using the first channel access procedure, that the shared carrier is available for transmission after the expiration of the first timer, transmit the first message to the other communication device via the shared carrier.

16. The communication device of claim 14, wherein the communication device is further configured to, when determining that the first channel access procedure ended before the expiration of the first timer:
start a second channel access procedure of the one or more channel access procedures.

17. The communication device of claim 16, wherein:
the second channel access procedure is shorter than the first channel access procedure; or
the first channel access procedure has a variable duration and the second channel access procedure has a fixed duration.

18. The communication device of claim 14, wherein:
starting the first channel access procedure includes
(i) determining a starting time for the first channel access procedure, and
(ii) starting the first channel access procedure at the starting time; and
determining the starting time includes
(i) determining the starting time based on a priority associated with the first message,
(ii) determining a duration of the first channel access procedure, and
determining the starting time based on the determined duration, or
(iii) setting the starting time to be a predetermined time interval before the expiration of the first timer.

19. The communication device of claim 14, wherein the communication device is further configured to:
start a second timer, wherein an expiration of the second timer corresponds to a desired transmission time for a second message, and wherein starting the first channel access procedure occurs before the expiration of the second timer;
determine, using the one or more channel access procedures, whether the shared carrier is available for transmission after the expiration of the second timer; and
based on whether the shared carrier is available for transmission after the expiration of the second timer, either transmit or not transmit the second message to the other communication device via the shared carrier.

* * * * *